US006937791B2

(12) United States Patent
Guy

(10) Patent No.: US 6,937,791 B2
(45) Date of Patent: Aug. 30, 2005

(54) OPTICAL COUPLING APPARATUS AND METHOD

(75) Inventor: James Kevan Guy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 90 days.

(21) Appl. No.: 10/428,645

(22) Filed: May 2, 2003

(65) Prior Publication Data

US 2004/0218858 A1 Nov. 4, 2004

(51) Int. Cl.[7] .................................................. G02B 6/32
(52) U.S. Cl. ........................................................ 385/33
(58) Field of Search .............................. 385/31, 33–35, 385/38, 39, 146, 147; 359/896; 362/551

(56) References Cited

U.S. PATENT DOCUMENTS

| | | | | | |
|---|---|---|---|---|---|
| 4,422,714 | A | * | 12/1983 | Benoit et al. | 385/39 |
| 4,767,172 | A | * | 8/1988 | Nichols et al. | 385/146 |
| 4,883,333 | A | * | 11/1989 | Yanez | 385/33 |
| 5,216,551 | A | * | 6/1993 | Fujii | 359/884 |
| 5,463,707 | A | * | 10/1995 | Nakata et al. | 385/35 |
| RE35,347 | E | * | 10/1996 | Bindon | 42/145 |
| 5,768,339 | A | * | 6/1998 | O'Hara | 378/147 |
| 5,815,614 | A | * | 9/1998 | Pan | 385/22 |
| 6,850,095 | B2 | * | 2/2005 | Sayers et al. | 362/551 |
| 2002/0191917 | A1 | * | 12/2002 | Wu et al. | 385/47 |
| 2004/0151466 | A1 | * | 8/2004 | Crossman-Bosworth et al. | 385/140 |
| 2004/0213001 | A1 | * | 10/2004 | Sayers et al. | 362/334 |

* cited by examiner

*Primary Examiner*—Sarah Song
(74) *Attorney, Agent, or Firm*—Harness Dickey & Pierce P.L.C.

(57) ABSTRACT

Apparatus and method for focusing light from an extended light source onto a secondary focal point (such as an input end of a light guide element). The apparatus includes a solid conic body formed in accordance with an ellipse, off axis paraboloid, or other conic shape, within which is disposed a refractive focusing lens. A first portion of the light rays (i.e. high angle light rays) generated by the extended light source are reflected through total internal reflection (TIR) by a first portion of the solid conic body onto the secondary focal point. A second portion of the light rays (i.e., low angle light rays), which would otherwise not be reflected by the solid conic body, are refracted by the focusing lens onto the same secondary focal point. Thus, by superposition, substantially all of the optical energy from the extended light source is coupled onto the secondary focal point.

18 Claims, 4 Drawing Sheets

FIG. 9.

| | | | | |
|---|---|---|---|---|
| Acrylic | $n_1$ | 1.491 | | |
| Sapphire | $n_2$ | 1.768 | 5mm Ball Lens | |
| Acrylic | $n_3$ | 1.491 | | |
| | $r_1$ | 0.0492 in | 2.500 mm | |
| | $r_2$ | −0.0492 in | 2.500 mm | |
| | $t$ | 0.0984 in | 5.000 mm lens thickness | |
| | $f_o$ | 0.2000 in | | |
| | $f_{i'}$ | −0.9680 in | | |
| | $f_{i''}$ | 0.3719 in | | |
| | TCL | 0.6703 in | 2.100 in | = 2*C From Ellipse Calculations |
| Magnification | | 0.38 | $M$ = image height/source height = $f_{i''}/f_{i'}$ | |
| | $D_{image}$ = | 0.015 in | 0.38 mm | |

| | | | |
|---|---|---|---|
| A = | 1.141 in | 28.99 mm | |
| B = | 0.447 in | 11.35 mm | |
| C = | 1.050 in | 26.67 mm | |
| y = | 0.175 in | 4.45 mm | $y=b*sqrt(1-(C/A)^2)$ |
| die size = | 0.039 in | 1.00 mm | |
| $\alpha$ = | 6.415 | | $\alpha=atan(die\ size/(2*y))$ |
| $\gamma$ = | 4.766 | | $\gamma=atan(y/(2*C))$ |
| $\beta$ = | 78.819 | | $\beta=90-\gamma-\alpha$ |
| $D_{Illuminated}$ = | 0.480 in | 12.19 mm | $D_I=2*((2*C/\tan\beta)-y)$ |
| $D_{spot}$ = | 0.144 in | 3.66 mm | $D_{spot} \approx 30\% * D_{Illuminated}$ |
| Magnification | 3.66 | | |

Thick Lens Calculation

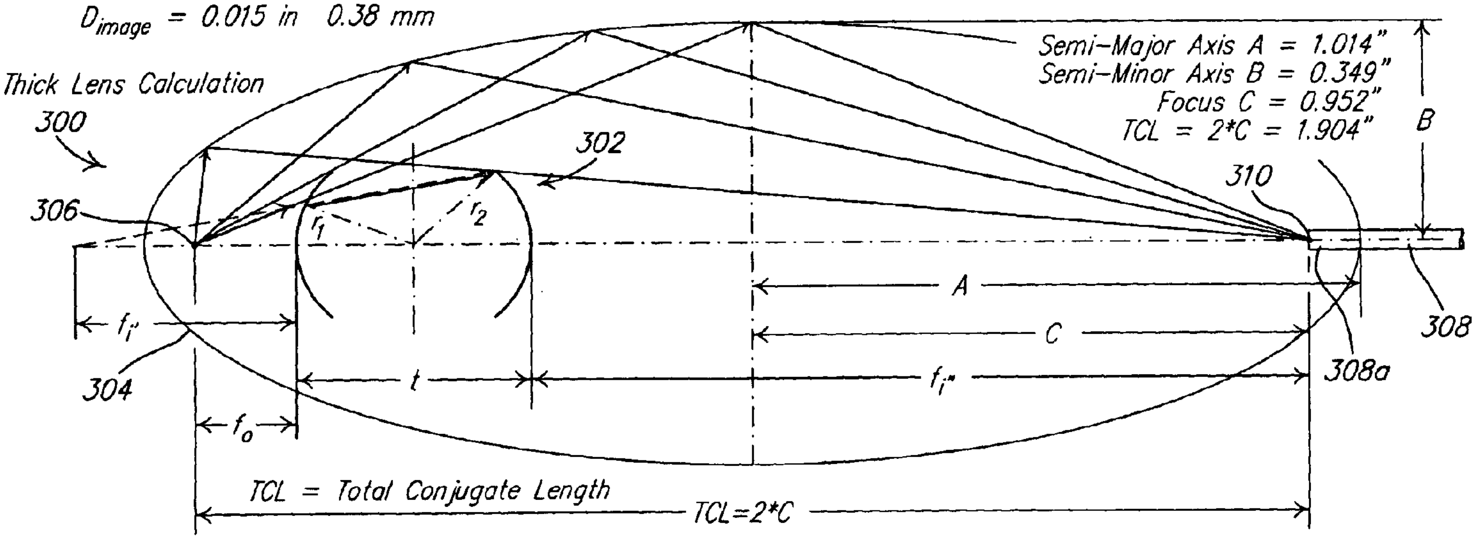

OPTICAL COUPLING APPARATUS AND METHOD

FIELD OF THE INVENTION

The present invention relates to optical coupling systems, and more particularly to an optical coupling system and method for focusing an optical signal from an extended light source into a small diameter light guide.

BACKGROUND OF THE INVENTION

The coupling of light into a light guide component, such as a fiber optic, waveguide, mixing rod, etc., has proven to be a significant challenge for optics engineers. Particularly, the problem of finding an extremely efficient apparatus and method of coupling light into a small diameter fiber optic or other type of small diameter light guide component, so that a remote source system efficiency approaches that of a direct source lighting system, has proven to be especially challenging.

Most light sources are characterized as "extended sources". By this it is meant that they are larger than an ideal point source (i.e., filaments, arcs, etc.) Trying to couple an extended source into a light guide component such as a fiber optic has proven difficult with the present day methods and apparatus because such methods and apparatus typically use single optics or reflectors, single materials, or multiple separate optics in an attempt to focus the light into somewhat of a "point" of light.

One example of a known focusing system involves a complex parabolic concentrator (CPC) also known as an axiconic paraboloid. It is an off axis paraboloid body of revolution. This apparatus provides a desirable output distribution but the size of the illuminated zone provided by the device is on the order of the size of the reflector diameter, and/or the length is very long in comparison to the size of other system components typically employed with the apparatus.

The most compact focusing geometry for focusing light from an extended source onto a light guide component is the ellipsoid reflector. The problem with either the complex parabolic concentrator or an ellipsoid reflector is capturing the light from zero degrees to the angle where the reflector begins to manage the light rays. This is illustrated in FIG. 1. A significant percentage of optical energy is not reflected by the ellipsoid, and therefore not focused onto the light guide component. Accordingly, some secondary method is needed to manage this quantity of optical energy that needs to be focused towards the light guide element.

SUMMARY OF THE INVENTION

The present invention is directed to an apparatus and method for focusing light from an extended source into a light guide. A solid conic body of revolution is employed which has a focusing lens disposed therein. The focusing lens is disposed along a longitudinal axis of the solid conic body and in a predetermined position relative to a focus of the solid conic body. An extended light source is also positioned either adjacent to or partially within an input end of the solid conic body such that its light output is directed into an interior area of the solid conic body.

The solid conic body is used to reflect a first portion of the light that is not directed at the focusing lens. Put differently, that portion of the light from the extended source that diverges by such a degree that it does not impinge the focusing lens is reflected through total internal reflection (TIR) by the solid conic body towards a light guide element disposed a predetermined distance from the focus of the solid conic body, and coaxially aligned with the focus. A second portion of the optical signal from the extended light source impinges the focusing lens and is refracted thereby towards the light guide element. Thus, both the first portion and the second portion of the optical signal from the extended light source are focused on the light guide element.

In one preferred form, the solid conic body uses TIR to reflect light diverging between about 20° to about 90° from a semi-major axis of the solid conic body, while the focusing lens handles low angle light from approximately 0° to about 20°. In one preferred form, the solid conic body is formed from acrylic. In one preferred form, the focusing lens comprises a sphere. In other preferred forms the focusing lens comprises a two piece lens having a pair of facing concave surfaces. In yet another preferred form the focusing lens comprises an aspheric barrel lens. In yet another preferred form the focusing lens comprises a Fresnel lens.

In one preferred form, the solid conic body has a recess machined at its input end for receiving therein the focusing lens. The recess is filled with ultra violet (UV) cured or two part, index matching epoxy. A portion of the extended light source may also be inserted within the bore and adhered therein via the index matching epoxy. In another preferred form, the solid conic body can be split along the axis in such a way as to create an injection moldable "half body". The two halves are to joined with epoxy and the focusing lens embedded clamshell style therebetween.

The present invention thus incorporates both reflective and refractive optics for focusing substantially all of the optical energy from an extended light source into a very small diameter light guide element, for example a fiber optic cable.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a schematic diagram of an exemplary embodiment of the present invention incorporating two independent focusing lens surfaces (using Thick Lens equations), and exemplary dimensions for the location of the focusing lens within a solid conic body portion of the apparatus.

DETAILED DESCRIPTION OF THE PREFERRED EMBODIMENTS

The following description of the preferred embodiment(s) is merely exemplary in nature and is in no way intended to limit the invention, its application, or uses.

Figure 1:
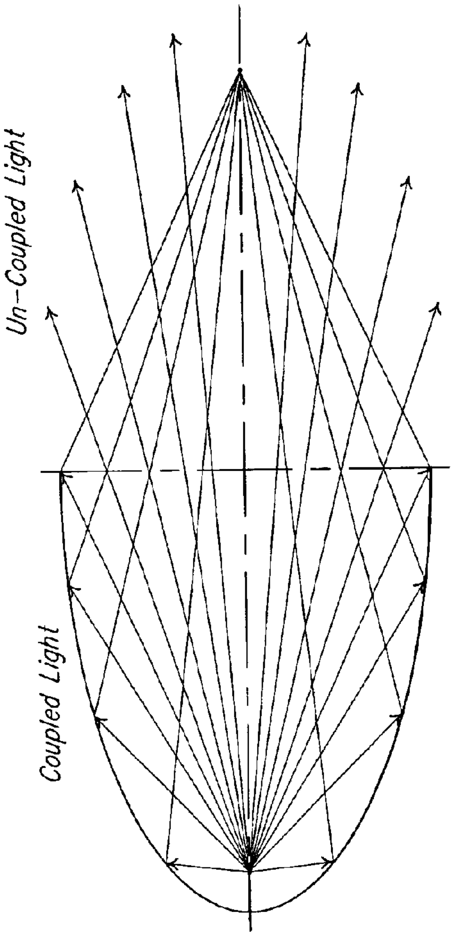
FIG. 1 is a simplified side view of a well known reflector illustrating how a significant portion of the light rays from an extended light source miss being reflected by the reflector, and are therefore not coupled into a light guide element.
Figure 2:
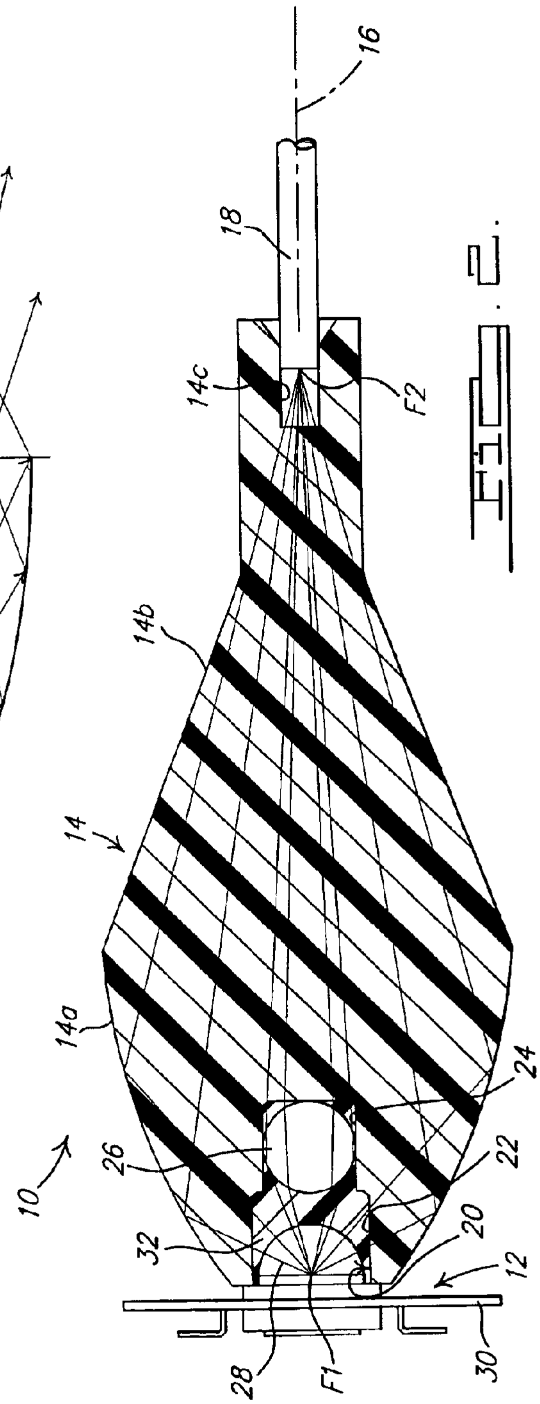
FIG. 2 is a side view of an apparatus in accordance with a preferred embodiment of the present invention.
Figure 3:
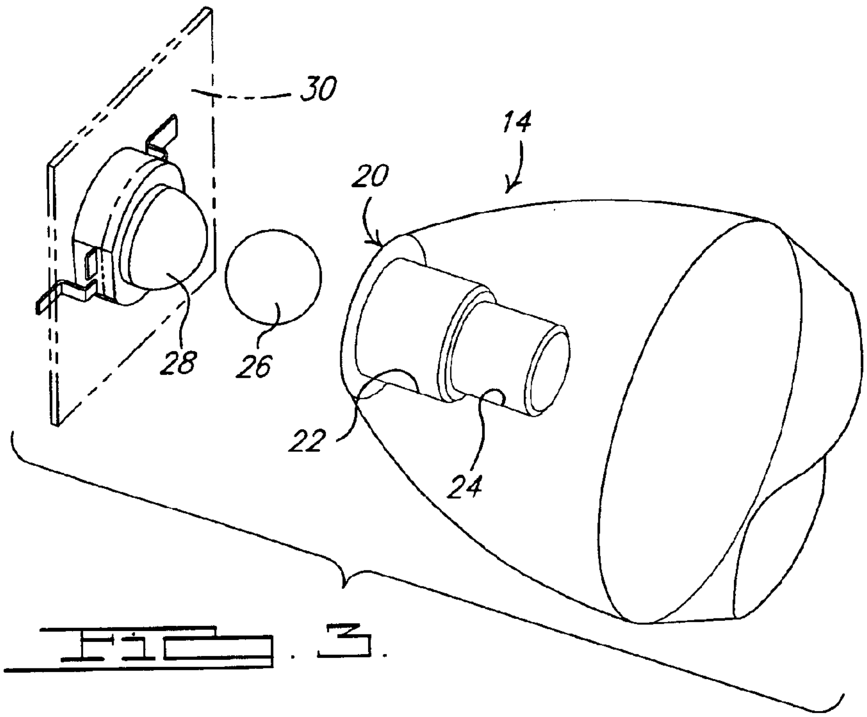
FIG. 3 is an exploded perspective view of the apparatus of FIG. 2.
Figure 4:
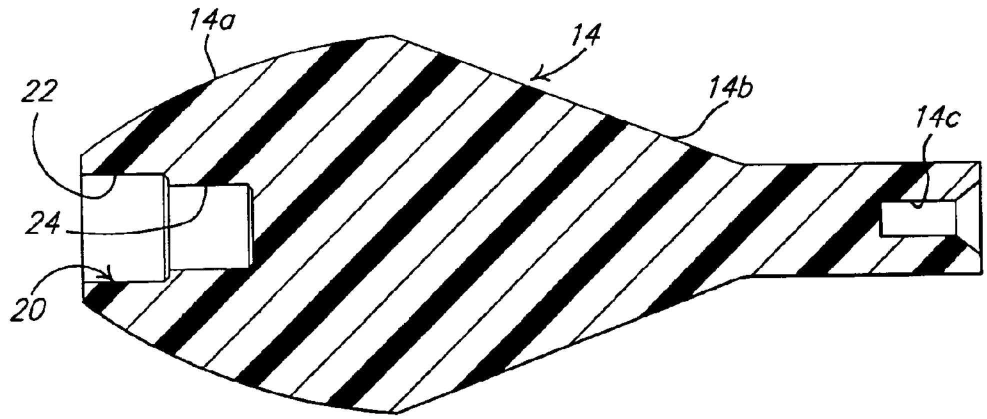
FIG. 4 is a side cross sectional view of the solid conic body shown in FIG. 3 taken in accordance with section line 4—4 in FIG. 2.
Figure 5:
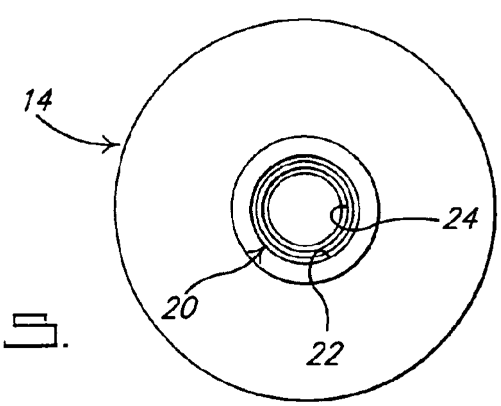
FIG. 5 is an end view of the apparatus of FIG. 4 taken in accordance with directional line 5—5.

Referring to FIGS. 2, 3 and 4, an apparatus 10 in accordance with a preferred embodiment of the present invention for focusing the light output from an extended light source is illustrated. The apparatus is denoted by reference numeral 10 while the light source is represented by reference numeral 12. It will be appreciated immediately that the light source 12 may be physically coupled to the apparatus 10, thus forming an integral part of the apparatus 10, or may be a separate component fixedly supported adjacent the apparatus 10. The apparatus 10 comprises a solid conic body 14 having a longitudinal axis 16 longitudinally aligned with an optical light guide element 18. The solid conic body 14 is formed to have an outer shape at a first end 14*a* in accordance with an ellipse, off axis paraboloid or any other conic shape that has two foci F1 and F2.

The light guide element may comprise any form of optical light guide, such as a optical fiber, light pipe, wave guide, mixing rod, etc. Solid conic body 14 includes a bore 20 having a first portion 22 and a second portion 24. Disposed within the second portion 24 is one embodiment of a spherical focusing lens 26. Disposed within the first portion 22 is a dome portion 28 of the extended light source 12. In one preferred form the extended light source 12 comprises a light emitting diode (LED). The extended light source 12 is typically mounted on a circuit board 30, and the circuit board 30 is supported by a suitable means or component, but more typically a heat sink component (not shown). The dome portion 28 is disposed at the first focus (F1) of the solid conic body 14.

Referring further to FIGS. 2–5, the solid conic body 14 is preferably comprised of an optically transparent polycarbonate material, and more preferably from an optically transparent acrylic material, which may be formed in any suitable manner, but most typically from a molding process such as injection molding. The focusing lens 26 forms a spherical ball having a diameter just slightly smaller than a diameter of the portion 24 of bore 20. The lens 26 may be formed from a variety of materials, but in one preferred form comprises a sapphire spherical lens. Alternatively, the focusing lens 26 could be comprised of other high index transmissive materials in order to create the index differential required to focus the light, such as Schott SF59, Cleartran, Cubic Zirconium, etc.

The solid conic body 14 preferably includes a recess 14*c* into which an input end portion 18*a* of the light guide element 18 can be inserted. It will be appreciated that the input end 18*a* is disposed at the other focus (F2).

With further reference to FIG. 2, the spherical ball focusing lens 14 is sealed within the portion 24 of bore 20 by the use of a suitable epoxy, and more preferably by a ultraviolet (UV) cured, index matching epoxy 32. The epoxy 32 is placed in the bore 20 after the focusing lens 14 is inserted into portion 24 of the bore 20. Before the epoxy 32 is cured, the LED 28 of extended light source 12 may be placed into the first portion 22 of the bore 20 and adhered therein as the epoxy 32 is cured with an ultra-violet light. One suitable epoxy is available from Norland Products, Inc. of New Brunswick, N.J.

It will be appreciated that while the preferred embodiment described above incorporates a bore 20 for holding the focusing lens 26 therein, the solid conic body 14 may be formed through a suitable molding process so that the focusing lens 26 is encapsulated within the solid conic body 14 during the molding process. In this instance, there would thus be no need to form the bore 20. Still further, the LED 28 of the extended light source 20 could similarly be encapsulated within the solid conic body 14 if same was formed through a suitable molding process. Thus, it will be appreciated that the focusing lens 26 and the extended light source 12 could be secured to the solid conic body 14 in a number of different ways.

With continuing reference to FIGS. 2–4, the solid conic body 14 is illustrated as having a second end 14*b* forming a frustoconical portion. It will be appreciated that first (i.e., conically shaped) portion 14*a* could comprise any suitable conic shape capable of reflecting (and focusing) a portion of the optical energy from the extended light source 12.

Figure 6:
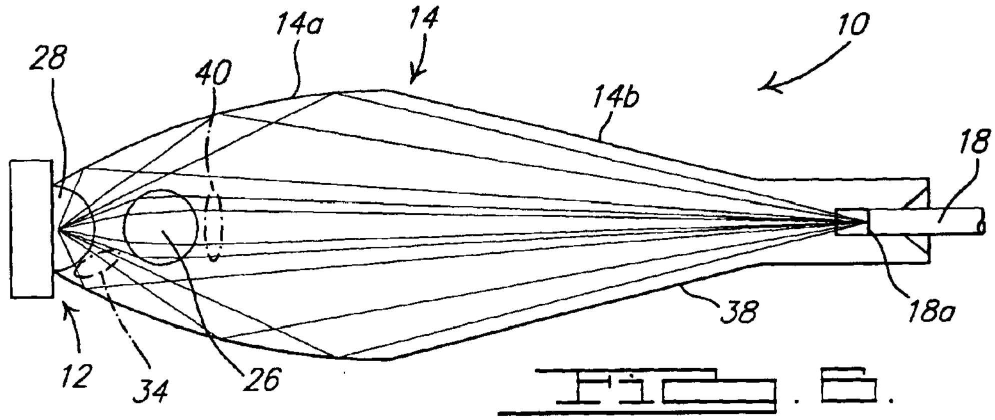
FIG. 6 is a simplified side view of the apparatus of FIG. 2 illustrating how both high angle and low angle rays are focused onto a light guide element.

Referring now to FIG. 6, the operation of the apparatus 10 will be described. The extended light source 12 generates optical energy in the form of light rays which are directed generally in the direction of the light guide 18. A first portion 34 of the light rays, which may be termed "high angle" light rays, are reflected by total internal reflection (TIR) from the first (i.e., conically shaped) portion 14*a* of the solid conic body 14. Light rays 34 are reflected such that they all are focused at a secondary focal point or input end 18*a* of the light guide element 18, which coincides with the second focus (F2) of the solid conic body 14. In this regard, the solid conic body 14 can be viewed as having an input end 36 which receives the optical energy from the LED 28 of the extended light source 12, while an opposite end 38 of the solid conic body 14 can be viewed as the "output" end.

A second portion of the optical energy from the LED 28 forms light rays that impinge upon the focusing lens 26. The focusing lens 26 is placed at a distance from the first focus F1 so as to be able to intercept the light rays that will not be impinging the conically shaped first portion 14*a* of the solid conic body 14. These light rays are designated by reference numeral 40 and can be termed "low angle" light rays. Light rays 40 are focused by the focusing lens 26 onto the secondary focal point (F2) or input end 18*a* of the light guide 18. Accordingly, substantially all of the optical energy generated by the LED 28 is focused at a very small "spot" formed by the input end 18*a* of the light guide 18. While the light rays 34 are reflected, the light rays 40 are refracted by the focusing lens 26. Thus, substantially all of the optical energy from the LED 28 is able to be focused into a small diameter spot to provide a very efficient means for coupling optical energy into the light guide 18.

Figure 7:
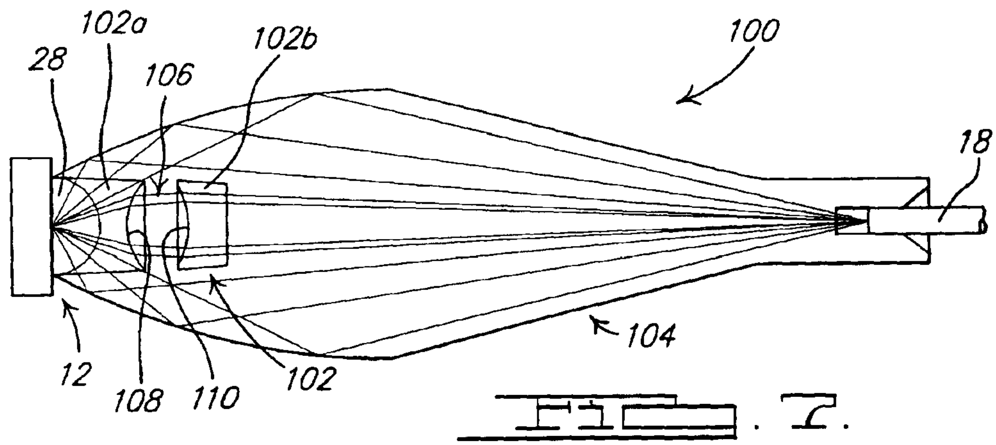
FIG. 7 is a simplified side view of an apparatus in accordance with an alternative preferred embodiment of the present invention incorporating a two piece focusing lens.

Referring to FIG. 7, an apparatus 100 in accordance with an alternative preferred embodiment of the present invention is shown. It will be appreciated that apparatus 100 is identical to apparatus 10 except for the use of a two piece, optically transparent, focusing lens 102 disposed within a solid conic body 104. The two piece focusing lens is separated by an air gap 106 and includes components 102*a* and 102*b*. Component 102*a* includes a concave surface 108 while component 102_b_ includes a concave surface 110. The operation of the apparatus 100 is identical to that described in connection with apparatus 10.

Figure 8:
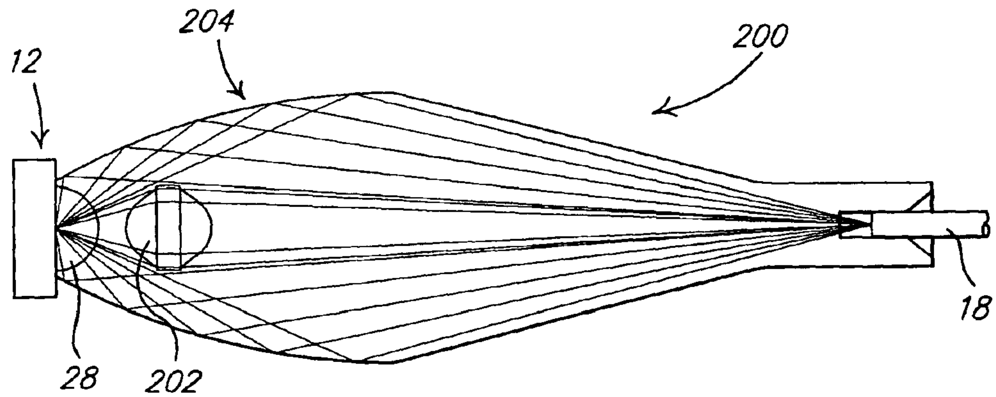
FIG. 8 is a simplified side view of an apparatus in accordance with another alternative preferred embodiment of the present invention incorporating an aspheric barrel lens therein.

FIG. 8 shows yet another focusing lens 200 in accordance with another alternative preferred embodiment of the present invention. Focusing lens 200 is also identical in construction to apparatus 10 with the exception of an aspheric focusing lens 202 which is disposed within a solid conic body of revolution 204.

It will be appreciated that the focusing lens could comprise virtually any form of focusing element (i.e. compound lens, Fresnel lens, ball lens, aspheric lens, barrel or drum lens, etc) could be incorporated within the solid conic bodies 14, 104 and 204 described herein. The principal requirement is that the focusing lens 26 is capable of focusing the low angle light rays which are not total internally reflected by the solid conic body of revolution.

Referring to FIG. 9, a diagram 300 illustrating the placement of a thick spherical focusing lens 302 within a solid conic body 304, in accordance with the principles of the present invention, is shown. It will be appreciated that the dimensions illustrated in FIG. 9 may vary significantly and will depend on the type of lens 302 being used, the radii of the two faces of the lenses 302, the overall dimensions of the solid conic body 304, and the distance separating focus 306 from the light guide element 308, which has its input end 308_a_ at focus 310. Accordingly, the diagram 300 and the dimensions given in FIG. 9 relative thereto are only meant to be exemplary and may be varied significantly to suit the needs of a specific application.

The present invention thus provides a means for efficiently focusing the output of an extended light source onto an input end of a light guide element through both refractive and reflective operations. An optimum design would match the focal point of the reflective and refractive optics as well as match the magnification of the high angle and low angle light rays. This design would yield the best superposition of illuminated spots from the reflective and refractive optics.

The various preferred embodiments of the invention, as set forth herein, each operate to refract a portion of the light rays emanating from the extended light source, as well as to reflect a separate, distinct portion of the light rays emanating from the extended light source such that both portions of the light rays are focused at a common, small diameter spot, and can therefore be efficiently coupled into an input end of a small diameter optical light guide. The various preferred embodiments described herein are readily manufacturable from well known optical materials and through well known manufacturing processes.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for focusing light generated from an extended light source into a beam able to be coupled into a light guide, comprising:

a solid conic body having a longitudinal axis for receiving said light and reflecting, through total internal reflection, a first portion of said light to an input end of said light guide;

a lens disposed within said solid conic body for refracting and focusing a second portion of said light, from said extended light source to said input end of said light guide; and wherein said lens comprises independent first and second components separated by an air gap.

2. The apparatus of claim 1, wherein said solid conic body comprises a solid body of material forming an off axis parabaloid.

3. The apparatus of claim 1, wherein said solid conic body comprises a solid body of material forming an ellipsoid.

4. The apparatus of claim 1, wherein said solid conic body is comprised of acrylic.

5. The apparatus of claim 1, wherein one of said lens components is molded within said solid conic body.

6. The apparatus of claim 1, wherein one of said lens components comprises a sapphire lens.

7. The apparatus of claim 1, wherein one of said lens components comprises an aspheric shaped lens.

8. The apparatus of claim 1, wherein one of said lens components comprises a ball lens.

9. The apparatus of claim 1, wherein one of said lens components comprises a Fresnel lens.

10. The apparatus of claim 1, wherein the lens comprises a barrel lens.

11. The apparatus of claim 1, wherein said lens comprises a drum lens.

12. An apparatus for focusing light generated from an extended light source to a light guide, comprising:

an optically transparent polycarbonate, conic body for receiving said light at an input thereof and reflecting, through total internal reflection, a first portion of said light to an output thereof, said output being in communication with said light guide;

a lens disposed within said polycarbonate, conic body for refracting and focusing a second portion of said light received at said input onto said light guide; and wherein said lens comprises first and second components separated by a gap.

13. The apparatus of claim 12, wherein said lens is molded within said polycarbonate, conic body so as to be encapsulated therein.

14. The apparatus of claim 12, wherein said polycarbonate, conic body is formed having an off axis parabolic shape.

15. The apparatus of claim 12, wherein said polycarbonate, conic body is formed having an ellipsoidal shape.

16. The apparatus of claim 12, wherein one of said lens components comprises a spherical lens.

17. The apparatus of claim 12, wherein one of said lens components comprises a sapphire lens.

18. The apparatus of claim 12, wherein one of said lens components comprises an aspheric shaped lens.

* * * * *